(12) United States Patent
Kristoffersen

(10) Patent No.: US 10,294,923 B2
(45) Date of Patent: May 21, 2019

(54) DAMPING OSCILLATIONS IN A WIND TURBINE

(71) Applicant: VESTAS WIND SYSTEMS A/S, Aarhus N (DK)

(72) Inventor: Jacob Krogh Kristoffersen, Viby J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/559,797

(22) PCT Filed: Mar. 16, 2016

(86) PCT No.: PCT/DK2016/050075
§ 371 (c)(1),
(2) Date: Sep. 19, 2017

(87) PCT Pub. No.: WO2016/150442
PCT Pub. Date: Sep. 29, 2016

(65) Prior Publication Data
US 2018/0066630 A1 Mar. 8, 2018

(30) Foreign Application Priority Data
Mar. 20, 2015 (DK) .................. 2015 70160

(51) Int. Cl.
*F03D 7/02* (2006.01)
*F03D 7/04* (2006.01)

(52) U.S. Cl.
CPC ......... *F03D 7/0296* (2013.01); *F03D 7/0224* (2013.01); *F03D 7/0292* (2013.01);
(Continued)

(58) Field of Classification Search
CPC ...... F03D 7/0296; F03D 7/0224; F03D 7/046; F03D 7/0292; Y02E 10/723; F05B 2270/334; F05B 2270/332; F05B 2270/32
See application file for complete search history.

(56) References Cited

U.S. PATENT DOCUMENTS 8,167,234 B1 * 5/2012 Moore ................... B64C 37/00
244/17.23
8,803,351 B2 * 8/2014 Dalsgaard ............. F03D 7/0224
290/44
(Continued)

FOREIGN PATENT DOCUMENTS

AU 2012200328 A1 8/2012
CN 103605912 A 2/2014
(Continued)

OTHER PUBLICATIONS

Danish Patent and Tradmark Office, Search Report for Application PA2015 70160, dated Oct. 20, 2015.
(Continued)

*Primary Examiner* — Charles R Kasenge
(74) *Attorney, Agent, or Firm* — Patterson + Sheridan, LLP

(57) ABSTRACT

Embodiments herein describe using a tower damping system to reduce oscillations in a wind turbine. To do so, the dampening system may use a metric that is decoupled from the activation strategy in order to control the blade pitch and avoid or mitigate feedback loops. In one embodiment, the dampening system measures a force on the turbine that is correlated to a fatigue loading on the tower. Furthermore, the turbine may perform a calculation to decouple the force from the activation strategy. That is, the turbine determines the value of the force as if the damping system was not activated or present. In addition, the dampening system uses the current wind speed and a wind distribution to generate a
(Continued)

pitch reference value. The dampening system may use both the pitch reference value and the fatigue loading on the tower to reduce the tower oscillations.

20 Claims, 7 Drawing Sheets

(52) U.S. Cl.
CPC .......... *F03D 7/046* (2013.01); *F05B 2270/32* (2013.01); *F05B 2270/332* (2013.01); *F05B 2270/334* (2013.01); *Y02E 10/723* (2013.01)

(56) References Cited

U.S. PATENT DOCUMENTS

| | | | |
|---|---|---|---|
| 9,097,236 B2* | 8/2015 | Zhou | F03D 7/0292 |
| 9,567,978 B2* | 2/2017 | Marwaha | F03D 7/046 |
| 2007/0041837 A1* | 2/2007 | Ide | F03D 7/0224 |
| | | | 416/147 |
| 2009/0169379 A1* | 7/2009 | McClintic | F03D 7/0236 |
| | | | 416/31 |
| 2010/0014971 A1* | 1/2010 | Risager | F03D 7/0224 |
| | | | 416/1 |
| 2010/0133827 A1* | 6/2010 | Huang | F03D 7/0224 |
| | | | 290/44 |
| 2012/0200087 A1* | 8/2012 | Schindele | F03D 7/0296 |
| | | | 290/44 |
| 2013/0035798 A1 | 2/2013 | Zhou et al. | |
| 2013/0161955 A1* | 6/2013 | Dalsgaard | F03D 7/0224 |
| | | | 290/44 |
| 2013/0187383 A1* | 7/2013 | Esbensen | F03D 7/043 |
| | | | 290/44 |
| 2013/0195653 A1 | 8/2013 | Hayashi et al. | |
| 2013/0230396 A1 | 9/2013 | Wakasa et al. | |
| 2014/0178195 A1 | 6/2014 | Blom et al. | |
| 2014/0219797 A1* | 8/2014 | Friedrich | F03D 7/0228 |
| | | | 416/1 |
| 2016/0115941 A1* | 4/2016 | Marwaha | F03D 7/046 |
| | | | 416/1 |

FOREIGN PATENT DOCUMENTS

| | | |
|---|---|---|
| CN | 104251184 A | 12/2014 |
| EP | 2623776 A2 | 8/2013 |
| EP | 2626551 A2 | 8/2013 |
| EP | 2757256 A2 | 7/2014 |
| EP | 2784303 A1 | 10/2014 |
| WO | 2010069323 A2 | 6/2010 |

OTHER PUBLICATIONS

International Search Report for Application No. PCT/DK2016/050075, dated May 30, 2016.

Chinese Office Action for Application No. 201680024726.6 dated Oct. 31, 2018.

* cited by examiner

DAMPING OSCILLATIONS IN A WIND TURBINE

BACKGROUND

Field of the Invention

Embodiments presented in this disclosure generally relate to wind tower damping system, and more specifically, to decoupling a control signal from the activation strategy used to reduce oscillations in the wind turbine.

Description of the Related Art

Tower oscillations may arise each time a rotor blade passes the tower and generates wind that pushes against the tower. Another source for tower oscillations is wind turbulence which may cause periodic or instantaneous movements in the wind turbine tower. Oscillations and vibrations in a tower of a wind turbine may fatigue the wind turbine. If left unchecked, these oscillations can have a detrimental effect on the lifespan of the wind turbine.

One way of compensating for tower oscillations is to design the tower with these oscillations in mind. For example, tower oscillations may be reduced by making the tower stiffer, designing the blades to mitigate oscillations, reducing the weight of the nacelle and rotor, etc. But these design measures often conflict with other desired qualities of the wind turbine such as low cost and high efficiency. As such, some turbines include a tower damping system that is used to actively counter tower oscillations and vibrations detected in the turbine.

SUMMARY

Embodiments of the present disclosure are a method and a computer-readable storage medium for operating a wind turbine. The method and storage medium include determining a tower fatigue weight value based on a force exerted on the wind turbine and determining a wind weight value based on measured wind conditions and a wind distribution. The method and storage medium include combining the tower fatigue weight value and the wind weight value to yield a combined gain value and determining a pitch actuation value for dampening an oscillation in the wind turbine based on the combined gain value.

Another embodiment of the present disclosure is a wind turbine controller includes a processor and a tower dampening system coupled to the processor. The tower dampening system is configured to determine a tower fatigue weight value based on a force exerted on the wind turbine and determine a wind weight value based on measured wind conditions and a wind distribution. The tower dampening system is configured combine the tower fatigue weight value and the wind weight value to yield a combined gain value and determine a pitch actuation value for dampening an oscillation in the wind turbine based on the combined gain value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
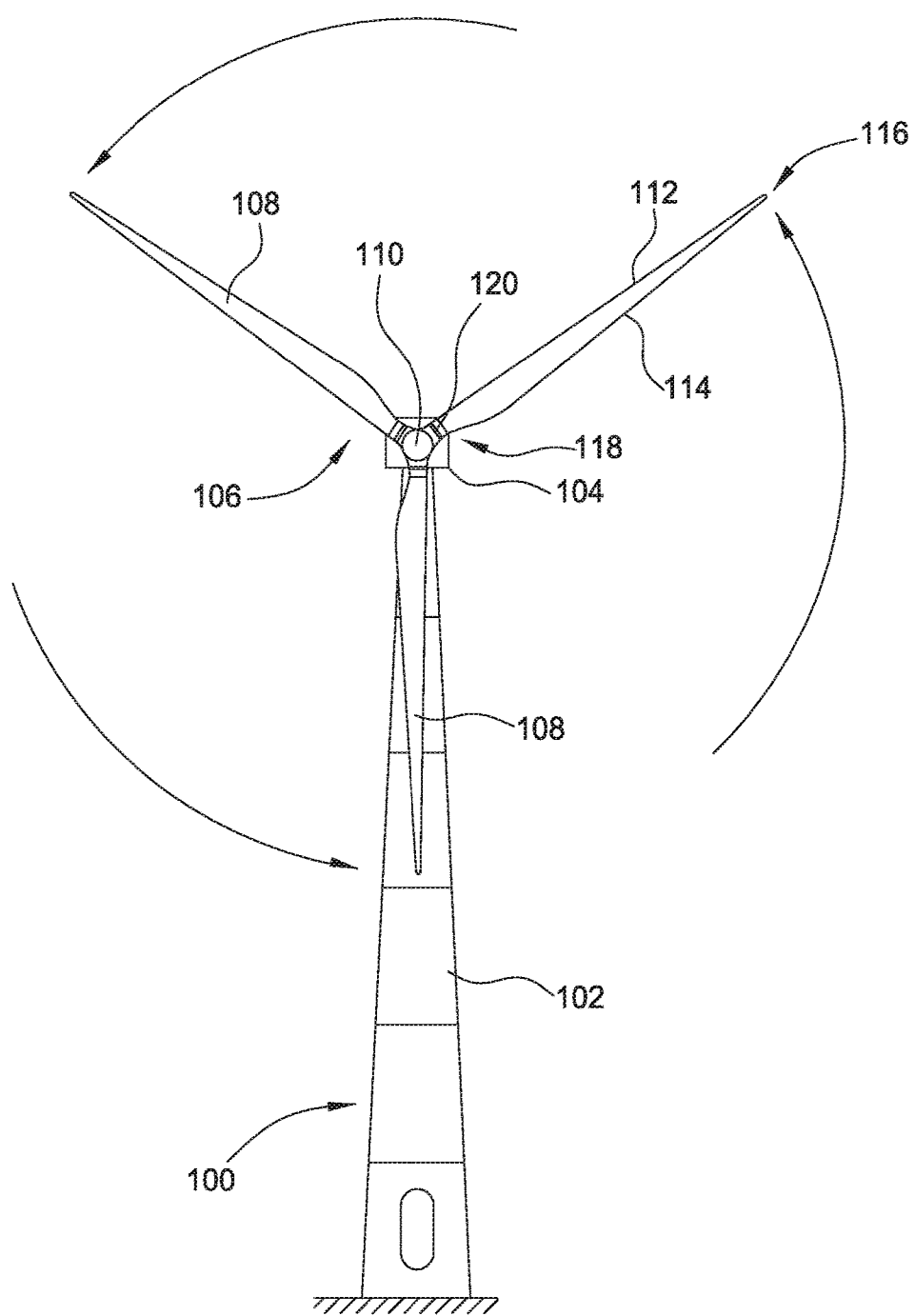
FIG. 1 illustrates a diagrammatic view of a wind turbine, according to an embodiment described herein.

Embodiments herein describe using a tower damping system to actively counter oscillations (or vibrations) in a wind turbine. If left unchecked, these oscillations can cause structural harm to the tower or other components in the turbine and reduce the lifespan of the wind turbine. Examples of tower damping systems include a side-side tower damping (SSTD) system, which reduces tower oscillations in the left and right directions when facing a rotor plane, and a fore-aft tower damping (FATD) system, which reduces tower oscillations in the forward and backward directions when facing the rotor plane. These damping systems generate output signals that are then provided to other physical control systems in the turbine (e.g., blade pitch controllers or power controllers) which then use the output signals to reduce oscillations in the turbine.

The tower damping system may measure one or more accelerations in the wind turbine (e.g., tower accelerations) to detect oscillations in the turbine. As these accelerations increase, the tower damping system increases the amplitude of a damping pitch reference value which is then used to control the pitch of blades in the turbine's rotor. Doing so, however, introduces a feedback loop in a controller which may cause a limit cycle and make tuning the controller more difficult. For example, as the tower acceleration increases, the damping system increases the pitch reference value in order to decrease the tower oscillation and the tower acceleration. However, as the measured acceleration decreases, in response, the damping system decreases the pitch reference value which permits the tower oscillation to increase. This cycle may continue so long as the source of the tower oscillation is present. Instead of relying solely on the tower acceleration to determine the pitch reference value, it may be advantageous to use a metric that is decoupled from the activation strategy (e.g., a metric that is independent of the tower dampening system) in order to control the blade pitch and avoid or mitigate this feedback loop.

In one embodiment, a force exerted on the wind turbine is used to generate the pitch reference value. This force may either be measured or estimated from other values. For example, the force may be a strain on the tower of the turbine that is measured using a strain gauge, or the force may be a thrust on the rotor. In any case, this force can be correlated to a fatigue loading on the tower. Furthermore, the turbine may perform a calculation to decouple the force from the activation strategy. That is, the turbine determines the value of the force as if the damping system was not activated or present. Using the thrust on the rotor as an example, the damping system estimates a rotor thrust that represents the force on the rotor in the absence of any damping system. That is, the damping system estimates the thrust of the rotor as if the damping system was not changing the pitch of the blades on the rotor. This rotor thrust can then be correlated to a fatigue loading of the turbine. By using a rotor force that is independent of (i.e., is decoupled from) the damping system to generate the pitch reference value, the feedback loop and limit cycle mentioned above can be avoided or mitigated.

In one embodiment, the tower damping system uses the current wind speed and a wind distribution to generate the pitch reference value. Although a wind turbine may experience greater turbulence (and thus, greater oscillations) at higher wind speeds, the wind turbine may spend relatively fewer hours operating at the higher wind speeds when compared to lower wind speeds. For example, being subjected to winds at 20 m/s for one hour might cause greater tower fatigue than experiencing winds of 10 m/s for the same amount of time, but if the turbine spends only a small fraction of its lifespan operating in 20 m/s wind speeds compared 10 m/s wind speeds, then much higher percentage of the damage done to the tower may occur because of 10 m/s winds than 20 m/s winds. Thus, the damping system may use a wind distribution that includes a set of weights that assign a weight value to various wind speeds. The values of the weights in the distributions may change based on the amount of time the wind turbine operates at the corresponding wind speed. For example, a greater weight may be assigned to 10 m/s than 20 m/s. The damping system can use the weight corresponding to the current wind distributions to generate the pitch reference value. Thus, when determining the amplitude of the pitch reference value, the damping system considers the amount of time the turbine is expected to be subjected to that wind speed over its lifetime in order to determine the amplitude of the pitch reference value. As such, in some scenarios, the pitch reference value may have a greater value when the current wind speed is at 10 m/s than when the wind speed is at 20 m/s.

The embodiments herein may provide a tradeoff between reducing the fatigue loading on the tower and causing wear-and-tear on the blade pitching system. Put differently, because the tower oscillations detected by the tower damping system are reduced using the blade pitching system, the techniques described herein optimize this relationship so that the blade pitching system is efficiently used to reduce the tower oscillations, thereby minimizing both tower fatigue loading and wear-and-tear on the blade pitching system. For example, by using a metric that is decoupled from the activation strategy, the damping system can prevent feedback loops that reduce the effectiveness of the system. Moreover, by using a wind distribution that defines the amount of time the turbine is expected to operate at various wind speeds, the damping system can drive the blade pitching system the hardest at the wind speeds that cause the most damage to the tower.

Example Embodiments

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators or stepper motors, for example, connected between the hub 110 and the blade 108.

Figure 2:
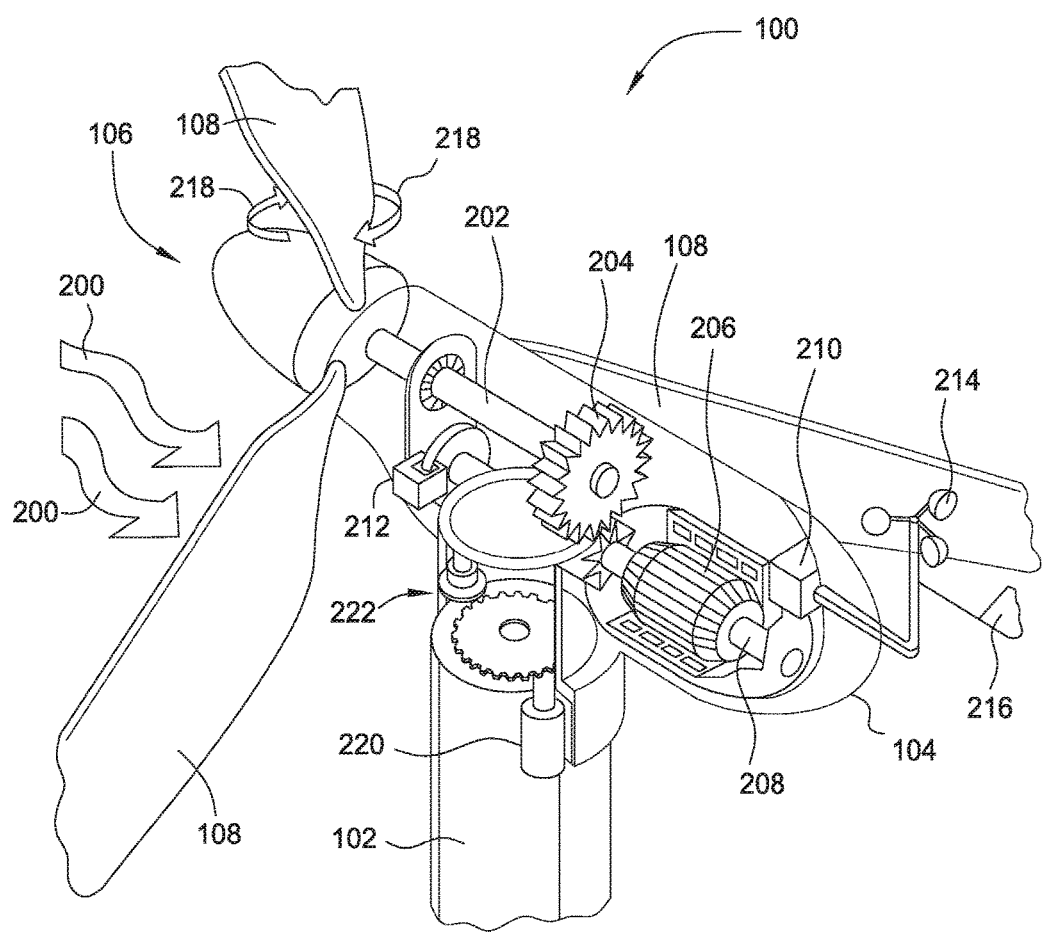
FIG. 2 illustrates a diagrammatic view of the components internal to the nacelle and tower of a wind turbine, according to an embodiment described herein.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
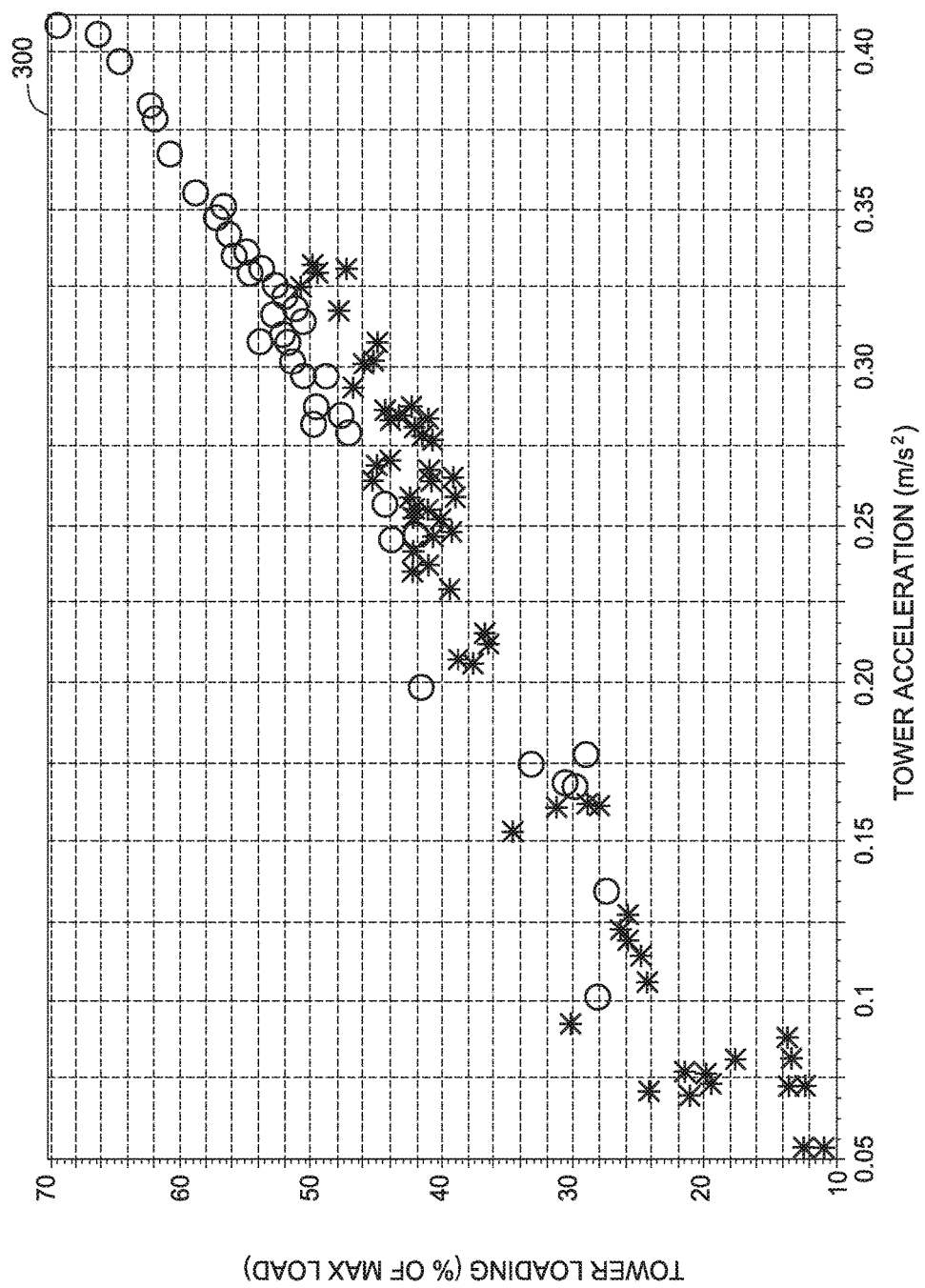
FIG. 3 is a chart illustrating relationships between tower acceleration and fatigue loading on the tower, according to an embodiment described herein.

FIG. 3 is a chart 300 illustrating relationships between tower acceleration and fatigue loading on the tower, according to an embodiment described herein. Chart 300 illustrates the relationship between tower loading (y-axis) shown as a percentage of the maximum load the tower is designed to withstand and the acceleration of the tower (x-axis). For example, the wind turbine may include one or more accelerometers located in the turbine (e.g., in the nacelle or tower). A tower damping system can use the measured accelerations to detect tower oscillations. The O's in chart 300 illustrate a baseline that correlates measured tower accelerations to load on the tower when no tower damping system is being used. As shown, these marks create a substantially linear relationship between the acceleration and the load—i.e., as the measured acceleration increases, the load on the tower increases, and vice versa. In contrast, the X's in chart 300 illustrate operating points of a damping system that uses the measured tower accelerations to directly control the pitch reference value used to change the pitch of the blades on the rotor. Specifically, chart 300 illustrates the effect of the feedback loop described above where the damping system increases the amplitude of the pitch reference value which decreases the tower accelerations. In response to a decrease in tower accelerations, the damping system decreases the pitch reference value which permits the oscillations in the turbine to again increase (assuming the source of the tower oscillations is still present). The increase in tower acceleration causes the tower damping system to again increase the pitch reference value. In one embodiment, tuning the control system may help mitigate the effects of this feedback loop—e.g., by changing the pitch amplitude very slowly to reduce the effects of the feedback. However, if the pitch amplitude changes slowly, in some scenarios this may cause higher tower loading and in other scenarios may cause higher pitch system loading than is needed in order to dampen oscillations. Nonetheless, by removing the feedback, the controller can set the amplitude to the level needed and change this value when the tower loading changes.

The feedback loop arises because the metric used to calculate the pitch reference value (e.g., tower acceleration) is coupled to the activation strategy used by the tower damping system (i.e., is affected by changing the blade pitch angle). In one embodiment, to mitigate the effects of the feedback loop, the damping system uses a decoupled metric to control the pitch reference value—i.e., a metric that is not affected by the activation strategy. In one example, the feedback loop estimates the thrust of the rotor in the absence of the damping system. That is, although changes to the pitch reference value also changes the rotor thrust, the rotor thrust is estimated as if this change did not occur. In this manner, the estimated rotor thrust is decoupled from, or is independent of, the damping system. As will be described in more detail below, using the estimated rotor thrust to generate pitch reference value permits the damping system to have a more linear response between the tower loading and activation signal outputted by the tower dampening system, although this is not a requirement.

In another embodiment, to mitigate the effects of the feedback loop, the damping system may use a metric that is measured by a sensor on the wind turbine—e.g., a strain gauge on the tower. Like with the rotor thrust, the damping system may perform a calculation to decouple the measured force from the effects of the damping system—i.e., estimate the value of the force as if the damping system was inactive or not present. The damping system can use the decoupled metric to control the pitch reference value and remove the feedback loop or at least mitigate the effects of the loops.

Figure 4:
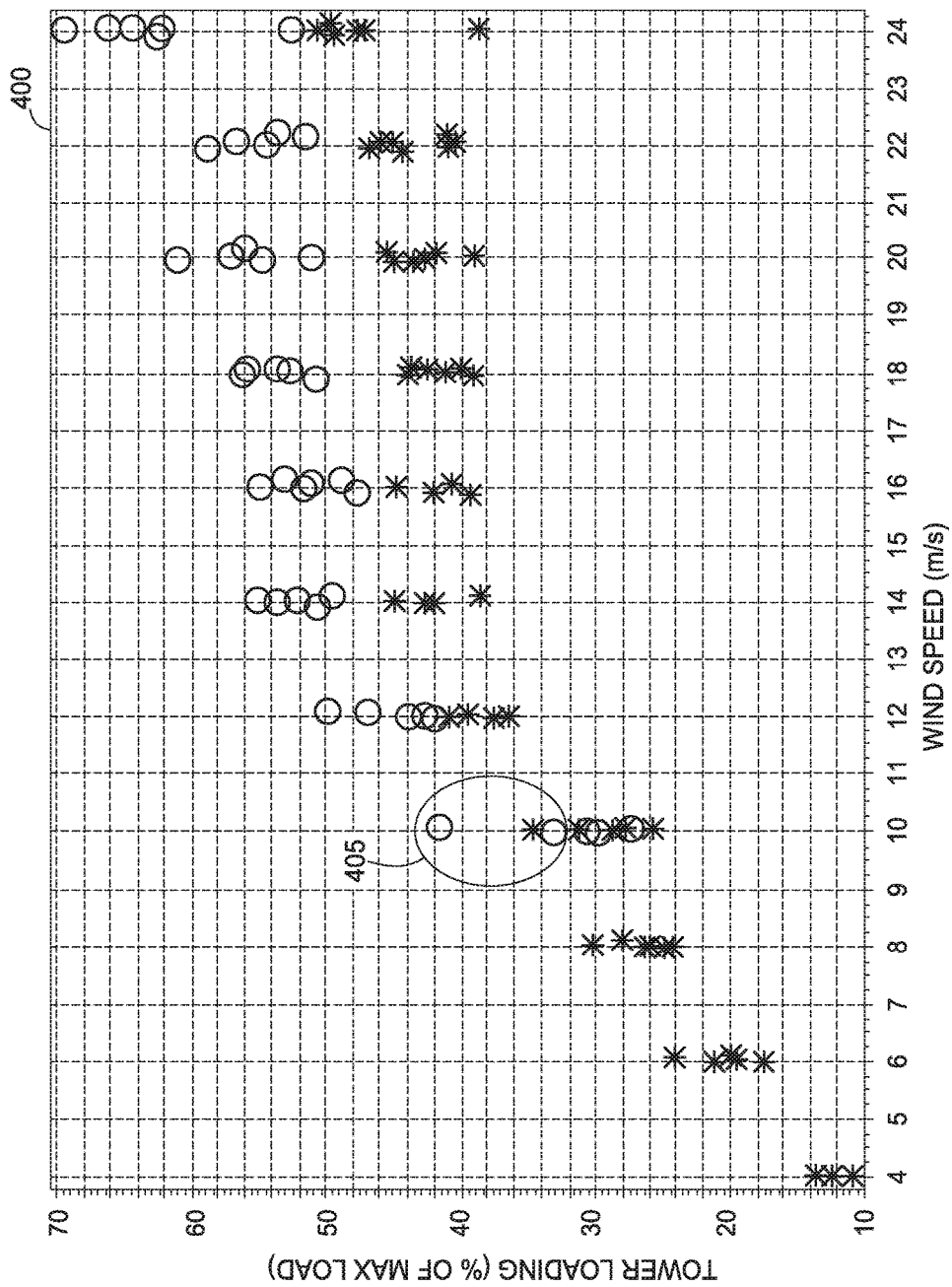
FIG. 4 is a chart illustrating relationships between wind speed and fatigue loading on the tower, according to an embodiment described herein.

FIG. 4 is a chart 400 illustrating relationships between wind speed and fatigue loading on the tower, according to an embodiment described herein. Chart 400 shows a different problem than FIG. 3. Here, tower fatigue loading is shown as being dependent on the wind speed. For example, chart 400 illustrates that the damping system may be more active at some wind speeds which do not cause significant damage to the wind turbine but less active at wind speeds which do cause significant damage.

Again, the O's represent a baseline relationship between wind speed and fatigue loading when no damping system is active, while the X's represent the operational points when the damping system is active—i.e., where the damping system increases the pitch reference value as the measured acceleration increases. Specifically, chart 400 includes a circle 405 at the rated wind speed of this particular wind turbine (e.g., 10 m/s). Here, the damping system correlates a lower tower fatigue loading than the baseline, and thus, will have a smaller pitch reference value. Because the pitch bearing loads are computed as the integral of the resultant moment on the bearing cubed and is multiplied by the pitch rate, near the rated wind speed (10 m/s) the thrust is at a maximum, and thus, it generates lots of wear and tear to use the pitch system at these speeds. As the wind speed increases, the damping system detects a greater fatigue loading, and thus, outputs a pitch reference value with a large amplitude—i.e., drives the blade pitch system harder.

However, this control strategy fails to consider the length of time that a turbine may be subjected to the various wind speeds. In chart 400, the damping system correlates an increase in wind speed to an increase to tower loading. Although loading does generally increase with wind speed, the fatigue experienced by the tower is also dependent on how long the turbine experiences that particular wind speed. If the turbine is in a location where it operates at the rated wind speed much more often than the higher wind speeds—e.g., greater than 20 m/s—a more efficient strategy may be to drive the blade pitch system harder at the rated wind speed than at the higher wind speeds.

Figure 5:
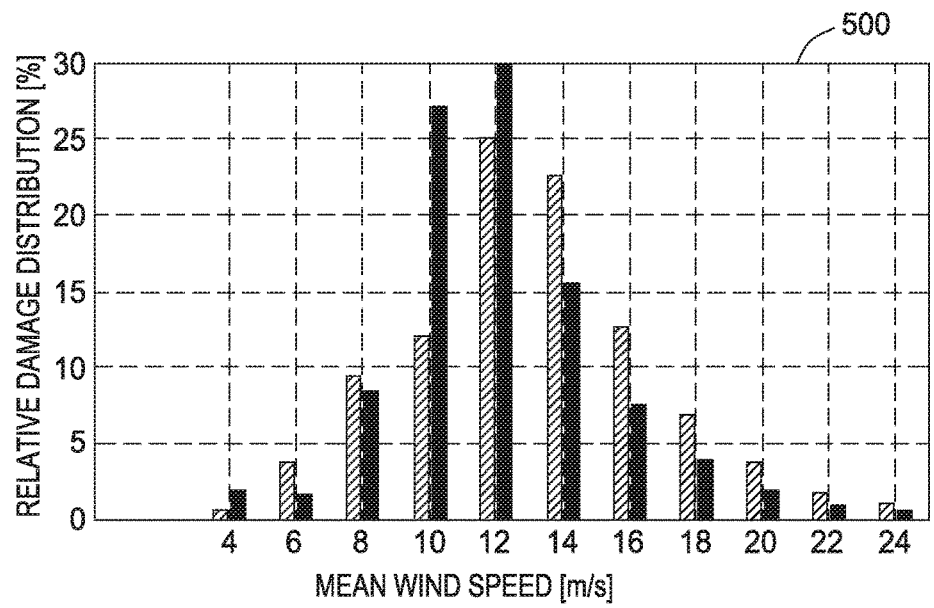
FIG. 5 is a chart illustrating respective damage distributions for the tower and pitching system at various wind speeds, according to an embodiment described herein.

FIG. 5 is a chart 500 illustrating respective damage distributions for the tower and pitching system at various wind speeds, according to an embodiment described herein. Chart 500 illustrates damage distributions of the tower and the blade pitch system when operating according to the damping system discussed in FIG. 4. The damage distribution of the tower is shown by the hatched bars while the damage distribution of the pitch blade system is shown by the solid bars. As the hatched bars illustrate, the greatest percentage of damage caused by tower oscillations occurs when the turbine is operating near the rated wind speed—e.g., wind speeds between 8-16 m/s. In fact, very little of the damage experienced by the tower occurs at the higher wind speeds—e.g., speeds above 18 m/s. This reflects the fact that the wind turbine, at least at this location, operates near the rated wind speed much more often than at the higher wind speeds.

However, the solid bars illustrate that the damage distribution of the blade pitch system (i.e., the wear-and-tear on blade pitch system) does not match the damage distribution of the tower. This indicates that the blade pitch system is being inefficiently used since it is driven harder at the higher wind speeds (which cause greater wear-and-tear on the blade system) even though relatively little damage is done to the tower at these speeds when compared to wind speeds below 16 m/s. For example, almost sixty percent of the damage experienced by a tower over its lifetime occurs at wind speeds between 12-16 m/s, however, only around fifty percent of the damage to the blade pitch system occurs at these speeds. Moreover, near the rated wind speed (10 m/s) there is a large cost when using the pitching system to reduce tower oscillations. While only 11 or 12 percent of the damage to the tower occurs at this speed, well over 25 percent of the damage to the pitching system occurs at this speed. Thus, chart 500 indicates that a damping system that considers the amount of time a wind turbine is subject to various wind speeds may be more efficient at controlling the blade pitch system than a damping system that only considers real-time measurements such as tower accelerations or the current wind speed at the turbine.

Figure 6:
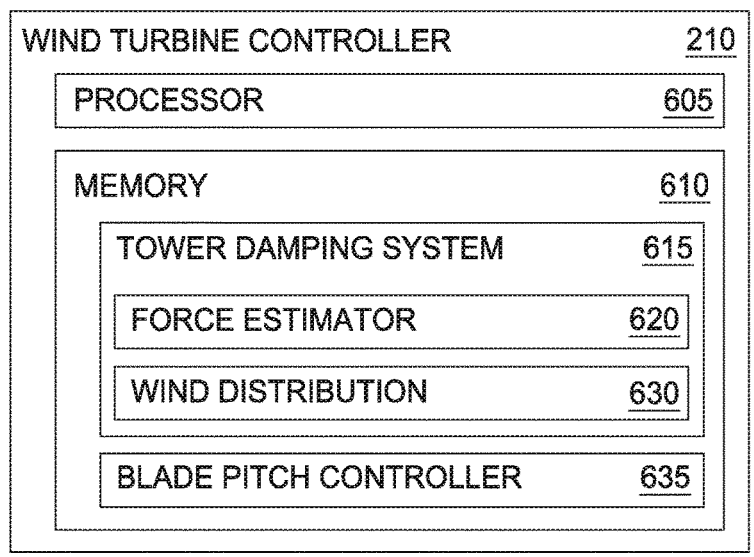
FIG. 6 is a block diagram of a wind turbine controller, according to an embodiment described herein.

FIG. 6 is a block diagram of a wind turbine controller 210, according to an embodiment described herein. Controller 210 includes a processor 605 and a memory 610. Processor 605 represents one or more processing elements that each may include one or more processing cores. Memory 610 may include volatile memory, non-volatile memory, or a combination of both. Furthermore, controller 210 may be located on the turbine 100 as shown in FIG. 2 or may located remotely of the turbine (e.g., as part of a supervisory control and data acquisition (SCADA) system).

Memory 610 includes a tower damping system 615 and a blade pitch controller 635. The tower damping system 615 may be either a FATD system or SSTD system as described above. The system 615 includes a force estimator 620 and a wind distribution 630. The force estimator 620 estimates a force exerted on the tower of the turbine as if the tower damping system 615 is inactive or omitted. In one embodiment, the force estimator 620 estimates the rotor thrust in the absence of any tower damping activities. That is, even though the tower damping system 615 generates control signals that change the blade pitch, thereby changing the thrust on the rotor, the force estimator 620 determines what the rotor thrust would be as if the blade pitch was not changed by the tower damping system 615. One equation that may be used to estimate the rotor thrust is shown below:

$$F_{TC} = F_T + \frac{\partial F_T}{\partial \theta} \Delta \theta_{OUT} \quad (1)$$

In Equation 1, $F_{TC}$ is the compensated thrust force as if the tower damping system 615 is inactive. In order to determine this force, the force estimator 620 combines the estimated instantaneous thrust force $F_T$ with the rotor thrust caused by the change in the pitch reference value generated by the tower damping system 615

$$\left(\text{i.e., } \frac{\partial F_T}{\partial \theta} \Delta \theta_{OUT}\right).$$

Stated differently, Equation 1 represents estimating the current rotor thrust $F_T$ and compensating for the portion of the current rotor thrust attributed to the control signals (i.e., pitch reference value) outputted by the tower damping system 615. Once this compensation is performed, the remaining force $F_{TC}$ is the force that would be on the rotor if the tower damping system 615 was inactive.

To estimate the instantaneous thrust force $F_T$, the force estimator 620 may include a simulation tool or application that uses the current blade pitch angle and the speed of the blade tip to estimate the current thrust on the rotor. For example, the simulation tool may use a two-dimensional blade model that generates the instantaneous thrust force $F_T$ using the blade pitch angle and tip speed as inputs. Alternatively, the turbine may include one or more sensors that permit the force estimator 620 to measure the instantaneous force on the rotor directly rather than using a simulation tool to estimate this force.

To estimate the thrust attributable to the tower damping system 615

$$\left(\text{i.e., } \frac{\partial F_T}{\partial \theta} \Delta \theta_{OUT}\right),$$

the force estimator 620 determines the change in rotor thrust caused by the pitch reference value currently being outputted by the tower damping system 615. For example, the force estimator 620 may include a lookup table that provides the change in rotor thrust corresponding to a set of pitch reference values. Once the effect of the tower damping system 615 is removed from the instantaneous rotor thrust $F_T$, the remaining force is the compensated thrust force $F_{TC}$. This force represents the thrust on the rotor as if the tower damping system 615 was inactive.

By estimating the rotor thrust in the absence of the tower damping system 615, the compensated instantaneous thrust force $F_{TC}$ is decoupled from the system 615. That is, Equation 1 results in a force that is not dependent on changes on thrust caused by the tower damping system 615. For example, the force $F_{TC}$ may instead depend on the current wind turbulence or other events that may cause oscillations in the tower. Thus, by using the force $F_{TC}$ as a control signal, the tower damping system 615 can avoid or mitigate the effects of the feedback loop discussed above (and shown in FIG. 3). For example, if wind turbulence is high, then the force $F_{TC}$ will be high. Even if the tower damping system 615 increases the amplitude of the pitch reference value in response to an increase in force $F_{TC}$, this change in the pitch reference value does not change the force $F_{TC}$ because any affect on rotor thrust is removed as shown in Equation 1—i.e., force $F_{TC}$ is decoupled from the tower damping system 615. Thus, using force $F_{TC}$ avoids a feedback loop where the output of the tower damping system 615 also affects its input.

Figure 7:
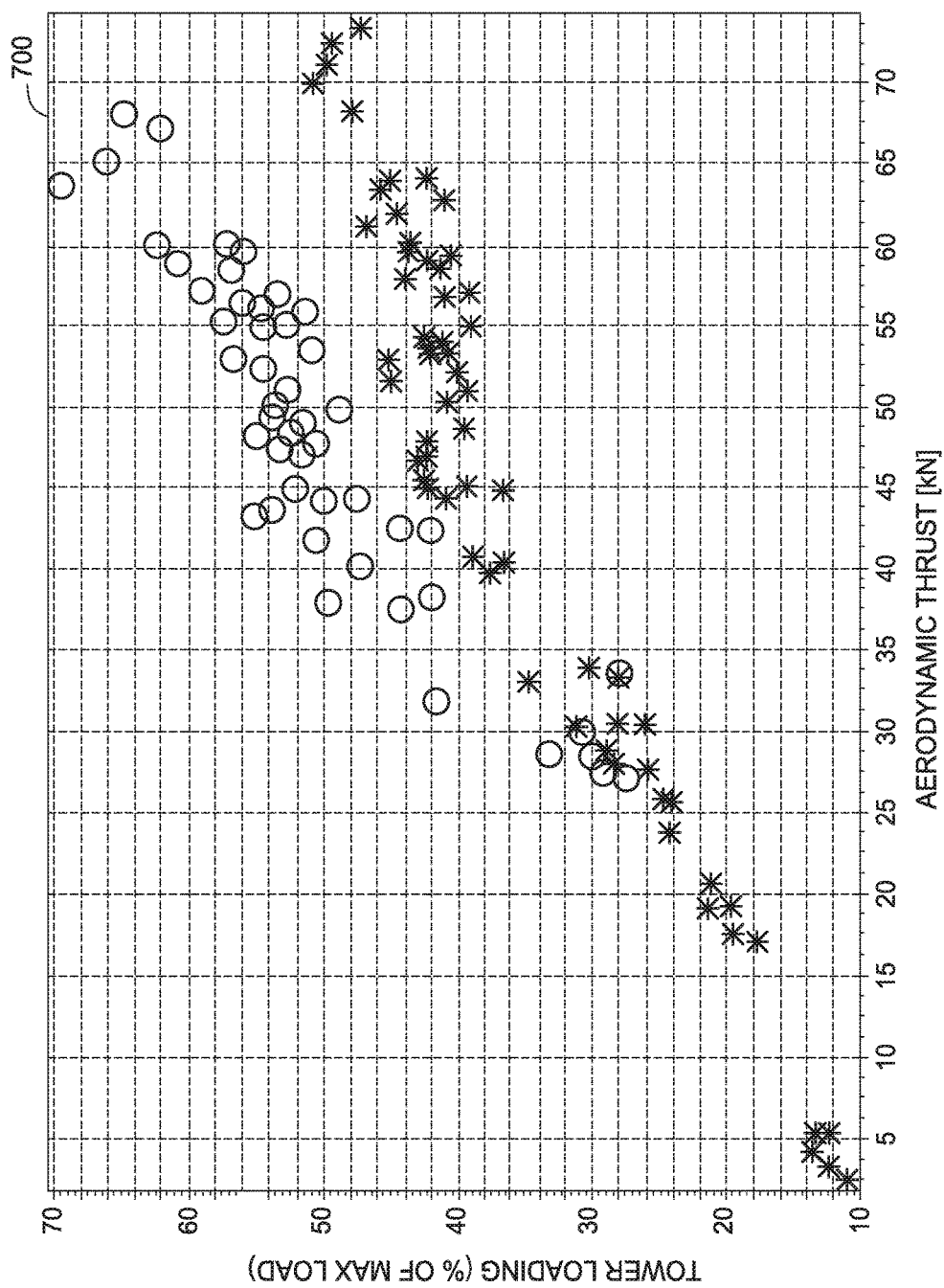
FIG. 7 is a chart illustrating relationships between thrust on the rotor and fatigue loading on the tower, according to an embodiment described herein.

FIG. 7 is a chart 700 illustrating relationships between a rain flow count of the estimated decoupled thrust and fatigue loading on the tower, according to an embodiment described herein. Chart 700 illustrates the relationship between tower loading (y-axis) and the rain flow count which is one technique for calculating fatigue loading (x-axis). The O's in chart 700 illustrate a baseline that correlates measured rotor thrust to load on the tower when no tower damping system is being used. As shown, these marks create a substantially linear relationship between the thrust and the load. The X's in chart 700 illustrate using a tower dampening system without any compensation for the effects of the feedback loop described above.

Returning to FIG. 6, instead of estimating a force on the rotor, the force estimator 620 may determine a force associated with the tower in order to identify the fatigue loading on the tower. For example, the wind turbine may include a strain gauge located on the tower. Using the data provided by the strain gauge, the force estimator 620 determines the value of the force as if the tower damping system 615 is inactive. For example, if the strain gauge measures a bending force or moment in the tower, the force estimator 620 estimates this force as if the tower damping system 615 was not actively outputting a control signal to reduce tower oscillations. Thus, like the rotor thrust described above, the estimated force is decoupled from the tower damping system and can be used as a control signal to estimate a tower fatigue loading.

The tower damping system 615 also includes the wind distribution 630 which contains historic or estimated time values at different wind speeds. For example, the wind distribution 630 may be estimated based on a feasibility study of a potential wind turbine site (when the turbines have not yet been installed). Using the measurements acquired during the study, the wind distribution 630 identifies what portion or percentage of time the wind turbines in the site are subjected to various wind speeds. In one embodiment, the wind distribution 630 may indicate the expected percentage that the turbine is subjected to a particular wind speed over its lifetime—e.g., the turbine is expected to be subject to wind speeds of 10 m/s for 30% of its lifetime.

In one embodiment, the wind distribution 630 changes or is adjusted based on update wind data measured at the wind turbine. The wind turbine (or the wind farm) may include sensors that continue to measure wind speed. This data may be used to change an original or initial distribution of the wind speeds. For example, the tower damping system 615 may project how previously measured wind speeds would distribute the wind over the turbine's lifetime. However, because newly measured wind speeds may change that projection, the tower damping system 615 can update the wind distribution 630 to better reflect the measured data.

Regardless of how the wind distribution 630 is generated, in one embodiment, the tower damping system 615 uses the distribution 630 to weight the control signal (e.g., pitch reference value) used to dampen tower oscillations. Referring back to FIG. 5, chart 500 illustrates that the majority of the damage done to the tower occurs at the wind speeds near 10-14 m/s. A control strategy that increases the amplitude of the control signal as the wind speed increases (i.e., the higher the wind speed, the greater the amplitude of the control signal) may use the blade pitch system less efficiently than a control strategy that considers the length of time the turbine spends at the various wind speeds. Thus, the tower damping system 615 uses the wind distribution 630 to scale the control signal. For example, the system 615 may drive the blade pitch system harder (e.g., increase the amplitude of the control signal) when the turbine is currently subjected to the wind speeds assigned the greatest weight in the distribution 630. Thus, in some scenarios, the tower damping system 615 may output a greater amplitude pitch reference value at low wind speeds than high wind speeds.

The blade pitch controller 635 receives the pitch reference value outputted by the tower damping system 615. Although not shown, the blade pitch controller 635 is communicatively coupled to one or more blade pitch actuators on the rotor which change the blade pitch angle. When setting the blade pitch angle, the blade pitch controller 635 may use other inputs besides the pitch reference value received from the tower damping system 615. For example, the blade pitch angle may also be set according to the current wind speed or a desired output power requested by a grid operator. These factors may then be combined in order to adjust the blade pitch angle on the blades in the rotor. In one embodiment, the pitch reference value received from the tower damping system 615 may be used as an offset value for pitching the blades. For example, the pitch reference value may instruct the blade pitch controller 635 to oscillate the current blade pitch angle by 2% at a certain frequency in order to dampen a tower oscillation. As the amplitude of the pitch reference value increases, the change in the blade pitch may also increase—e.g., from a 2% change to a 4% change in the current blade pitch angle. Although the embodiments herein describe using a tower damping system that outputs a control signal (e.g., the pitch reference value) for a blade pitch controller, the present disclosure is not limited to such.

Figure 8:
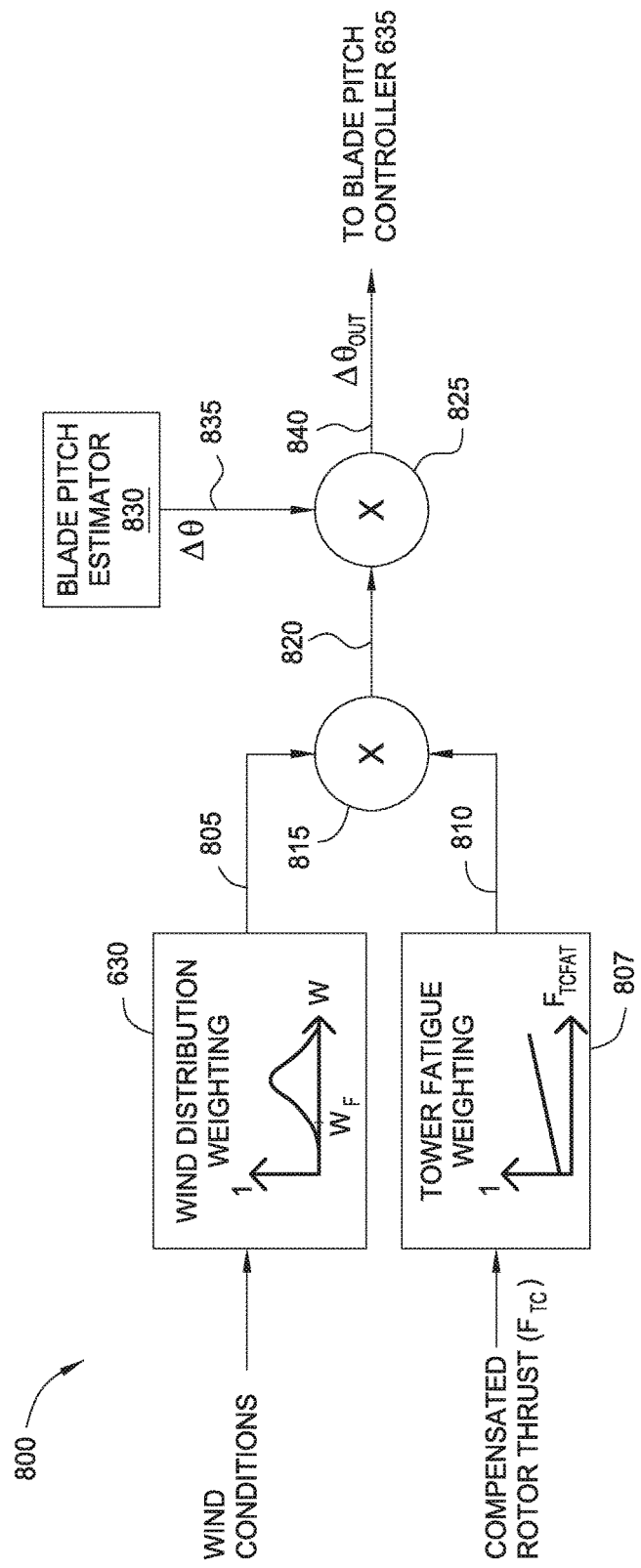
FIG. 8 is a flow for determining a blade pitch value for reducing oscillations in a wind turbine, according to an embodiment described herein.

FIG. 8 is a flow 800 for determining a blade pitch value for reducing oscillations in a wind turbine, according to an embodiment described herein. In one embodiment, flow 800 illustrates control logic performed by the tower damping system 615. As shown, flow 800 receives wind conditions and the compensated rotor thrust $F_{TC}$ as inputs. The wind conditions may be the wind speed measured at the wind turbine, a wind speed measured by a sensor upwind of the turbine, or a derived wind speed estimated from other factors. The wind conditions are then provided to the wind distribution 630 which outputs a weight 805 for the particular wind speed. As shown, the wind distribution 630 illustrates a bell curve where the greatest weight values correspond to the most common wind speeds, or stated differently, the winds speeds that the wind turbine operates in the most. Assigning the greatest weights to the most prevalent wind speeds may be based on the data illustrated in FIG. 5 where the majority of the tower damage occurs at the more common wind speeds—e.g., 10-14 m/s.

Flow 800 illustrates inputting the compensated rotor thrust $F_{TC}$ into a tower fatigue distribution 807 which is used by the tower damping system to assign a weight to the thrust. Although a rotor thrust is shown, the flow 800 can use any control signal that is decoupled from the tower damping system. For example, the flow 800 may use a bending force measured in the tower so long as the force is compensated to remove any effects caused by the tower damping system. The tower fatigue distribution 807 correlates the value of the compensated rotor thrust to a rain flow count ($F_{TCFAT}$) estimating the fatigue on the tower. Here, the relationship is linear where the fatigue loading on the tower increases as the rotor thrust increases—i.e., the greater the thrust, the greater fatigue on the tower. The tower fatigue distribution 807 includes a plurality of weights that correspond to the different rotor thrusts. Once a match is found, the flow 800 outputs a weight 810 representing the amount of tower fatigue caused by the compensated rotor thrust.

The weight 805 selected from the wind distribution 630 and the weight 810 selected from the tower fatigue distribution 807 are combined by multiplier 815 to yield a combined weight 820. Thus, weight 820 is derived from both the wind distribution 630 which considers the amount of time the wind turbine is expected to operate in various winds speeds and the tower fatigue distribution 807 which selects a weight using a control signal decoupled from the activation strategy used by the tower damping system.

Flow 800 includes a blade pitch estimator 830 which outputs a change in blade pitch ($\Delta\theta$) 835 using one or more inputs. In this example, the blade pitch change 835 may be based on tower accelerations as discussed above. That is, as the tower accelerates, the blade pitch estimator 830 may increase the blade pitch change 835. In one embodiment, the blade pitch change 835 may be a sinusoidal signal that includes signals at one or more frequencies. The blade pitch estimator 830 may set the frequency and amplitude of the sinusoidal signal according to changes in the tower accelerations. However, as discussed above, the tower accelerations are coupled to the wind damping system such that changes to the blade pitch affect the tower accelerations. Thus, flow 800 includes multiplier 825 that combines the blade pitch change 835 with the combined weight 820. Doing so results in a compensated blade pitch change ($\Delta\theta_{OUT}$) 840 which is the output of the tower damping system (i.e., the pitch reference value). The compensated blade pitch change 840 is provided to the blade pitch controller 635 which uses this change to reduce tower oscillations.

Combining the blade pitch change 835 with the combined weight 820 achieves at least two benefits. First, the compensated blade pitch change 840 is derived using a control signal (i.e., the compensated rotor thrust) which is decoupled from the tower damping system. This minimizes the effect that using a control signal that is coupled to the tower damping system, such as tower accelerations, when generating the blade pitch change 835. Second, the output of the tower damping system is adjusted using the wind distribution 630. That is, the compensated blade pitch change 840 changes according to the amount of time the turbine is expected to be subjected to that wind speed over its lifetime. Doing so may result in more efficient use of the blade pitching system relative to a control strategy that fails to consider the length of time the turbine is expected to operate at a given wind speed.

In the preceding, reference was made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method of operating a wind turbine, the method comprising:
   determining a tower fatigue weight value based on a force exerted on the wind turbine;
   determining a wind weight value based on measured wind conditions and a wind distribution;
   combining the tower fatigue weight value and the wind weight value to yield a combined gain value;
   receiving a blade pitch change from a tower dampening system;
   adjusting the blade pitch change using the combined gain value to determine a pitch actuation value for dampening an oscillation in the wind turbine; and
   transmitting the pitch actuation value to a blade pitch controller.

2. The method of claim 1, wherein the force exerted on the wind turbine comprises a thrust on a rotor in the wind turbine, wherein the rotor thrust represents a force on the rotor as if no tower dampening system is used to reduce the oscillation in the wind turbine.

3. The method of claim 2, further comprising:
   determining a current thrust of the rotor based on a pitch angle of a blade and a speed of the rotor;
   determining a change in thrust on the rotor resulting from the tower dampening system reducing the oscillation in the wind turbine; and
   determining the rotor thrust by combining the current thrust of the rotor and the change in thrust.

4. The method of claim 1, wherein determining the tower fatigue weight value comprises:
   correlating the rotor thrust to a tower fatigue distribution to determine the tower fatigue weight value.

5. The method of claim 1, wherein the wind distribution comprises a plurality of weights, each corresponding to a respective wind speed, wherein the plurality of weights change in value based on the amount of time the wind turbine is estimated to experience the corresponding wind speed.

6. The method of claim 1, wherein the force exerted on the wind turbine comprises a measurement provided by a strain gauge on the wind turbine.

7. The method of claim 1, wherein combining the tower fatigue weight value and the wind weight value comprises:
   multiplying the tower fatigue weight value and the wind weight value to yield the combined gain value.

8. The method of claim 1, wherein the force exerted on the wind turbine comprises a control signal that is decoupled from the tower damping system.

9. A wind turbine controller, comprising:
   a processor; and
   a tower dampening system coupled to the processor, the tower dampening system is configured to:
      determine a tower fatigue weight value based on a force exerted on the wind turbine,
      determine a wind weight value based on measured wind conditions and a wind distribution,
      combine the tower fatigue weight value and the wind weight value to yield a combined gain value,
      determine a blade pitch change;
      adjust the blade pitch change using the combined gain value to determine a pitch actuation value for dampening an oscillation in the wind turbine; and
      transmit the pitch actuation value to a blade pitch controller.

10. The wind turbine controller of claim 9, wherein the force exerted on the wind turbine comprises a thrust on a rotor in the wind turbine, wherein the rotor thrust represents a force on the rotor as if no tower dampening system is used to reduce the oscillation in the wind turbine.

11. The wind turbine controller of claim 10, wherein the tower dampening system is further configured to:
   determine a current thrust of the rotor based on a pitch angle of a blade and a speed of the rotor;
   determine a change in thrust on the rotor resulting from the tower dampening system reducing the oscillation in the wind turbine; and
   determine the rotor thrust by combining the current thrust of the rotor and the change in thrust.

12. The wind turbine controller of claim 9, wherein determining the tower fatigue weight value comprises:
   correlating the rotor thrust to a tower fatigue distribution to determine the tower fatigue weight value.

13. The wind turbine controller of claim 9, wherein the wind distribution comprises a plurality of weights, each corresponding to a respective wind speed, wherein the plurality of weights change in value based on the amount of time the wind turbine is estimated to experience the corresponding wind speed.

14. The wind turbine controller of claim 9, wherein the force exerted on the wind turbine comprises a measurement provided by a strain gauge on the wind turbine.

15. A non-transitory computer-readable storage medium storing computer-readable program code which, when executed on a processor, performs an operation, the operation comprising:
   determining a tower fatigue weight value based on a force exerted on a wind turbine;
   determining a wind weight value based on measured wind conditions and a wind distribution;
   combining the tower fatigue weight value and the wind weight value to yield a combined gain value;
   determining a blade pitch change;
   adjusting the blade pitch change using the combined gain value to determine a pitch actuation value for dampening an oscillation in the wind turbine; and
   transmitting the pitch actuation value to a blade pitch controller.

16. The non-transitory computer-readable storage medium of claim 15, wherein the force exerted on the wind turbine comprises a thrust on a rotor in the wind turbine, wherein the rotor thrust represents a force on the rotor as if no tower dampening system is used to reduce the oscillation in the wind turbine.

17. The non-transitory computer-readable storage medium of claim 16, wherein the operation further comprises:
   determining a current thrust of the rotor based on a pitch angle of a blade and a speed of the rotor;
   determining a change in thrust on the rotor resulting from the tower dampening system reducing the oscillation in the wind turbine; and
   determining the rotor thrust by combining the current thrust of the rotor and the change in thrust.

18. The non-transitory computer-readable storage medium of claim 15, wherein determining the tower fatigue weight value comprises:
   correlating the rotor thrust to a tower fatigue distribution to determine the tower fatigue weight value.

19. The non-transitory computer-readable storage medium of claim 15, wherein the wind distribution comprises a plurality of weights, each corresponding to a respective wind speed, wherein the plurality of weights change in value based on the amount of time the wind turbine is estimated to experience the corresponding wind speed.

20. The non-transitory computer-readable storage medium of claim 15, wherein the force exerted on the wind turbine comprises a measurement provided by a strain gauge on the wind turbine.

* * * * *